Aug. 23, 1938.    G. BECK    2,127,761
FISH LURE
Filed Dec. 29, 1937
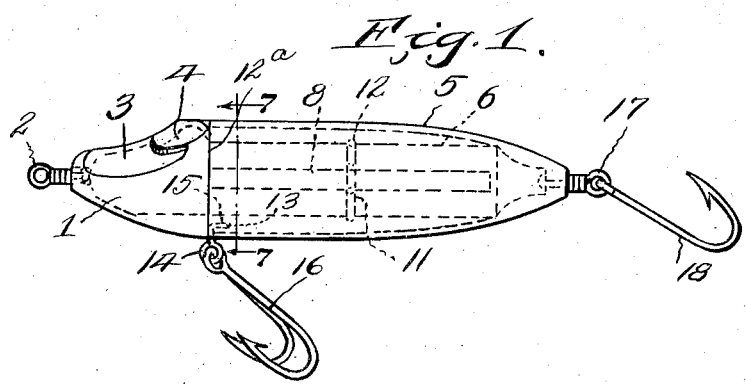
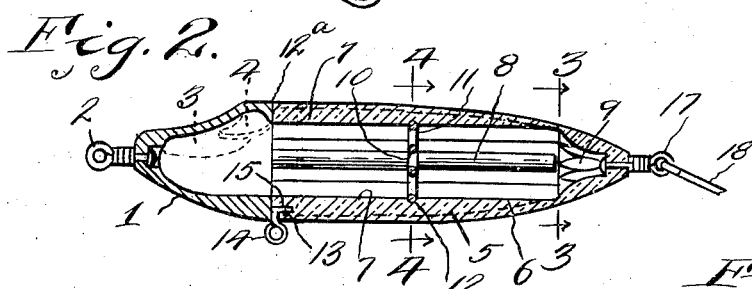
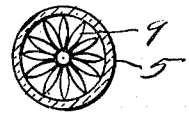
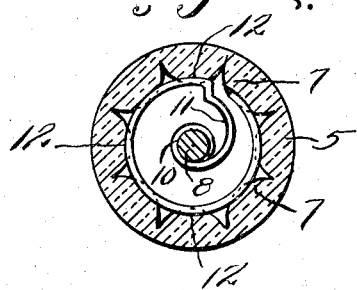
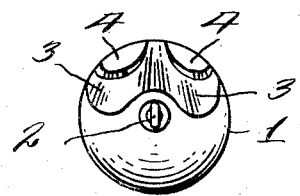
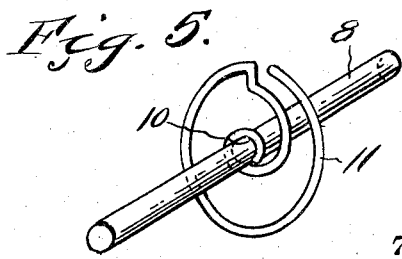
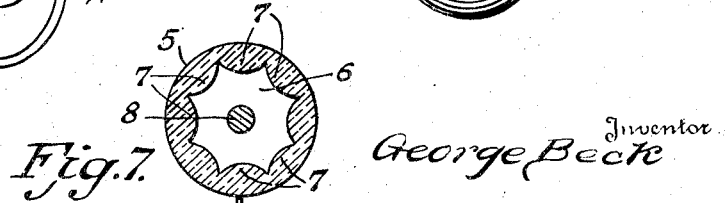
Inventor
George Beck
By Philip A. H. Terrell
Attorney Patented Aug. 23, 1938

2,127,761

UNITED STATES PATENT OFFICE 2,127,761

FISH LURE

George Beck, Irvington, N. J.

Application December 29, 1937, Serial No. 182,325

11 Claims. (Cl. 43—46)

The invention relates to fish lures, and has for its object to provide a device of this character comprising a transparent body having a chamber therein and a vibratory reflecting member in the chamber for reflecting light rays through the body for attracting fish.

A further object is to support the vibratory reflecting member in spring means whereby it will vibrate when drawn through the water.

A further object is to provide the walls of the chamber of the body with members for magnifying the light rays during the vibrating operation.

A further object is to mount the reflecting member within a spiral spring, anchored within the chamber of the body to increase the vibration thereof as the bait is drawn through the water for obtaining a rocking vibration as well as an axial movement.

A further object is to form the head of the bait body from a contrasting colored material to the chambered portion of the body and to permanently seal the chamber when the head is secured to the body, thereby preventing leakage.

A further object is to provide a hook receiving loop anchored in the forward end of the chambered portion of the body and sealed therein by the head.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a view in elevation of the lure.

Figure 2 is a vertical longitudinal sectional view through the lure.

Figure 3 is a vertical transverse sectional view through the lure taken on line 3—3 of Figure 2.

Figure 4 is a vertical transverse sectional view through the lure, taken on line 4—4 of Figure 2.

Figure 5 is a perspective view of the vibrating member.

Figure 6 is a front elevation of the lure.

Figure 7 is a transverse sectional view taken on line 7—7 of Figure 1.

Referring to the drawing, the numeral 1 designates the head of the lure, which is preferably formed from a non-transparent colored material, and 2 a line attaching loop carried by said head, and to which the line is attached for casting and drawing the lure through the water. The head 2 is provided with opposite surfaces inclined rearwardly and upwardly so the lure will dive as it is drawn through the water, said surfaces being designated by the numeral 3.

The surfaces 3, at their upper rear ends, terminate in raised members 4.

The body 5 of the lure is formed from a transparent material, such as glass or Celluloid, and which body is provided with a longitudinally extending chamber 6. The wall of the chamber 6 is formed with a plurality of longitudinally extending ribs 7 with their convexed sides inwardly disposed, and which ribs form means for reflecting light rays from the polished vibratory rod 8, axially disposed within the body 5. The ribs 7 merge into a conically shaped tail chamber having reflecting ribs 9, as clearly shown in Figure 3, hence it will be seen that the light rays will be reflected and magnified in action as the rod 8 vibrates when the lure is drawn through the water. The rod 8 is anchored in the inner convolution 10 of a coiled spring 11, and the outer convolution of the spring 11 is held in the concentric notches 12 in the ribs 7, therefore it will be seen that the rod 8 is spring supported in a manner whereby it will vibrate upon movement of the lure axially and rockably for reflecting light rays through the ribs 7 for attracting fish. It will also be seen that in assembling the rod, the spring 11 can be contracted, and the spring and rod forced into the chamber 6 until the outer convolution of the spring expands into the notches 12.

The forward end of the lure body 5 is secured to the head 1 at 12ᵃ by a waterproof adhesive, which also seals the chamber 5 against being flooded with water. The head also forms means for permanently holding the arms 13 of the angularly shaped hook receiving eye 14, the arms of which are received in the recess 15 in the forward end of the bait body 5.

Hooks 16 are attached to the eye 14 in the usual manner. The rear end of the bait body 5 is provided with a hook receiving eye 17 which carries the rear hooks 18 of the lure. It is to be understood that any kind of hooks may be used.

From the above it will be seen that a fish lure is provided with light ray reflecting means disposed in a chamber thereof, and from which light rays will be reflected through the body of the lure. It will also be seen that by providing vibrating means for the reflecting bar, the reflecting action will vary and by providing inwardly convexed ribs 7, the reflecting action will be magnified for rendering the lure more attractive to a fish.

The invention having been set forth what is claimed as new and useful is:

1. A fish lure comprising a chambered body formed from transparent material, magnifying reflecting members forming the inner wall of the body, and a reflecting member within the chamber of the body and from which reflected light rays pass through the magnifying reflecting members.

2. The combination with a fish lure having a chambered transparent body, of a vibratory reflecting member within the chamber of the body.

3. A fish lure comprising a transparent chambered body member and a spring supported vibrating reflecting member within the chamber of the body member.

4. A fish lure comprising a transparent body having a chamber therein, a reflecting bar within said chamber, and spring means supporting said reflecting bar and so constructed and arranged that said reflecting bar will vibrate upon movement of the lure.

5. A fish lure comprising a transparent body having a chamber therein, a reflecting member within said chamber, and a coiled spring surrounding said reflecting member and entirely supporting the reflecting member and so constructed and arranged that said reflecting member will vibrate, said coiled spring being anchored to the wall of the chamber.

6. A fish lure comprising a transparent body having a chamber therein, an elongated reflecting member supported in the chamber of the body in spaced relation to the walls of the chamber, spring means within the chamber for supporting the reflecting member and so constructed and arranged that it will vibrate, and reflecting members carried by the wall of the chamber and through which light rays are reflected from the reflecting member.

7. A device as set forth in claim 6 wherein the reflecting members within the chamber are formed by longitudinally extending inwardly convexed ribs.

8. A device as set forth in claim 6 including a tail chamber, and reflecting surfaces within the tail chamber, said reflecting members carried by the lure chamber being formed by longitudinally extending ribs merging into reflecting members in the tail chamber.

9. A fish lure comprising a transparent body having a chamber therein, the chamber wall being formed with light ray reflecting surfaces, a reflecting bar within the chamber in spaced relation to the wall thereof, and a coiled spring surrounding the elongated reflecting member and having inner and outer convolutions, the reflecting member being supported in the inner convolution, and the outer convolution being disposed in a channel in the chamber wall.

10. A fish lure comprising a chambered body of transparent material having its outer surface smooth and having its interior surface formed of a plurality of curved surfaces having different centers of curvature, and a central member within the body having free ends and intermediate support whereby any movement of the body will effect a vibratory movement of the central member.

11. A fish lure comprising a hollow transparent body and a member within the body, said member being only supported intermediate ends thereof from a part of the body, and adapted to be vibrated when the body is moved.

GEORGE BECK.